(12) United States Patent
Ham

(10) Patent No.: US 8,799,551 B2
(45) Date of Patent: Aug. 5, 2014

(54) GATEWAY APPARATUS FOR SUBSTATION AUTOMATION SYSTEM

(75) Inventor: Sung Sik Ham, Cheongju-Si (KR)

(73) Assignee: LSIS Co., Ltd., Anyang, Gyeonggi-Do (KR)

( * ) Notice: Subject to any disclaimer, the term of this patent is extended or adjusted under 35 U.S.C. 154(b) by 227 days.

(21) Appl. No.: 13/369,250

(22) Filed: Feb. 8, 2012

(65) Prior Publication Data

US 2012/0221763 A1    Aug. 30, 2012

(30) Foreign Application Priority Data

Feb. 24, 2011   (KR) .......................... 10-2011-0016737

(51) Int. Cl.
  *G06F 13/00*   (2006.01)
(52) U.S. Cl.
  USPC .......................................................... 710/315
(58) Field of Classification Search
  USPC .......................................................... 710/315
  See application file for complete search history.

(56) References Cited

U.S. PATENT DOCUMENTS

| 2006/0062226 A1 | 3/2006 | Harris et al. |
| 2006/0112211 A1 | 5/2006 | Sandy et al. |

FOREIGN PATENT DOCUMENTS

| CN | 1231445 | 10/1999 |
| KR | 20-0447920 | 3/2010 |

OTHER PUBLICATIONS

Universe II VME-to-PCI Bus Bridge User Manual; Tundra Semiconductor Corporation; Sections 1-7; Oct. 2002.*
Sharfi, Benjamin; "VMEbus advances aim at high data rates"; General Micro Systems Inc.; May 8, 2000; accessed via Internet Dec. 23, 2013 <www.embedded.com/print/4163394>.*
Grigonis, Richard "Zippy"; "Tutorial: The Bridges of cPCI and VME"; Apr. 1, 2000; accessed via Internet Dec. 23, 2013 <www.embedded.com/print/4130385>.*
"General Micro Systems unveils a screamingly-fast VME64-to-PCI bridge chip"; VMEbus Systems; Mar.-Apr. 2000.*
Quinnell, Richard A.; "Tech Insights: Bridging Chip Breaks Through PCI-To_VME Speed Bottleneck"; Electronic Design; pp. 37-38; Oct. 4, 1999.*
B. B. Carvalho et al., "A low cost PCI-VME controller for control and data acquisition systems on fusion experiments", Review of Scientific Instruments, vol. 70, No. 1, Jan. 1999.
Tundra, "Universer IITM VNE-to-PCI Bus Bridge User Manual", Oct. 2002, 456 pages.
The State Intellectual Property Office of the People's Republic of China Application Serial No. 201210045729.1, Office Action dated Apr. 21, 2014, 6 pages.

* cited by examiner

*Primary Examiner* — Glenn A Auve
(74) *Attorney, Agent, or Firm* — Lee, Hong, Degerman, Kang & Waimey

(57) ABSTRACT

A communication gateway apparatus for a substation automation system, the gateway includes a VERSA Module Eurocard (VME) bus to provide a data communication path, a Peripheral Component Interconnect (PCI)-VME module connected to the VME bus for communication and having a PCI-VME bus bridge circuit to transfer data of the VME bus to a PCI bus or data of the PCI bus to the VME bus, and a plurality of input/output modules connected to the VME bus for communication.

5 Claims, 1 Drawing Sheet

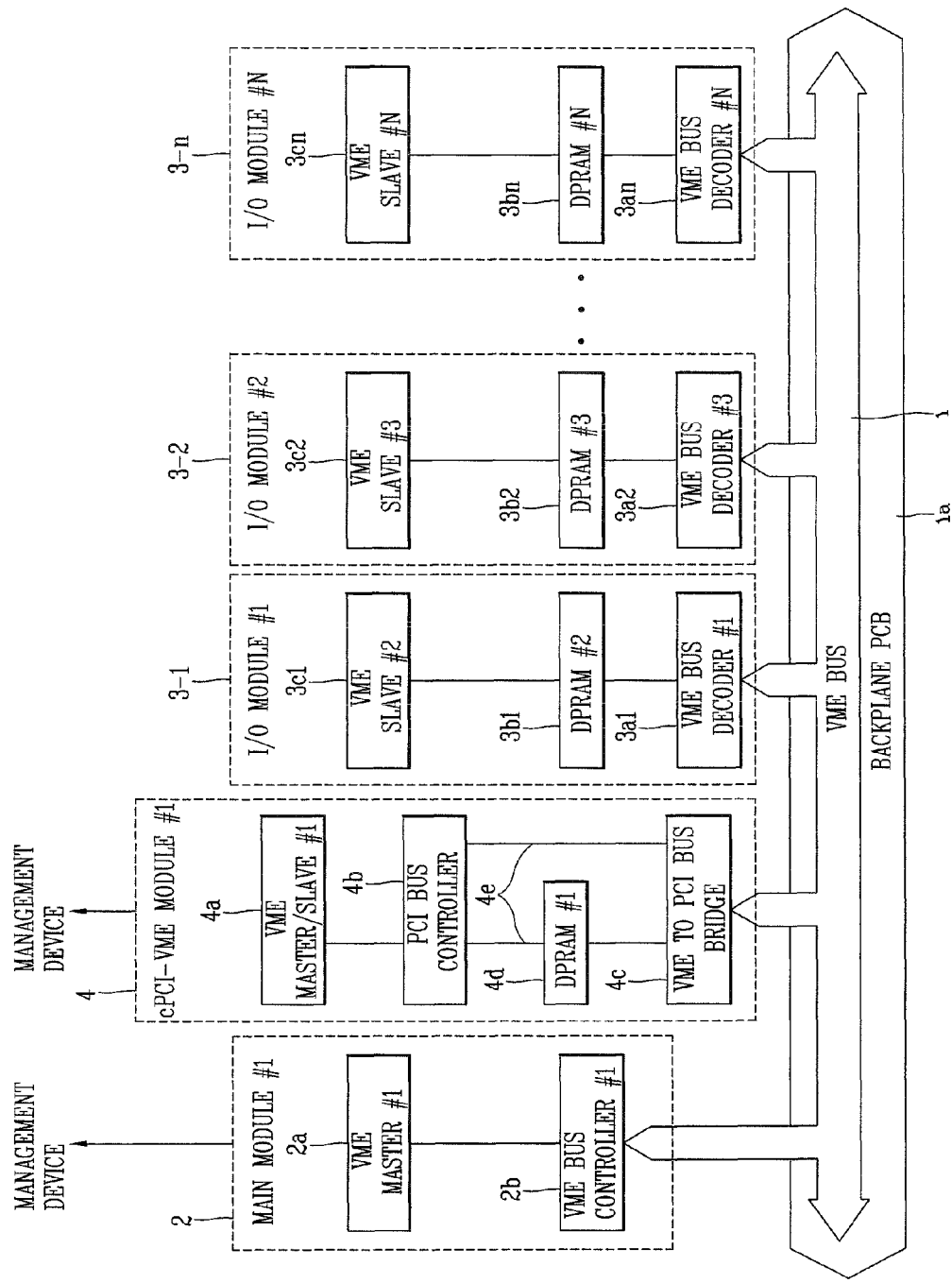

GATEWAY APPARATUS FOR SUBSTATION AUTOMATION SYSTEM

CROSS-REFERENCE TO RELATED APPLICATION

Pursuant to 35 U.S.C. §119(a), this application claims the benefit of earlier filing date and right of priority to Korean Patent Application No. 10-2011-0016737, filed on Feb. 24, 2011, the contents of which are hereby incorporated by reference herein in its entirety.

BACKGROUND OF THE INVENTION

1. Field of the Invention

This disclosure relates to a substation automation system, and particularly, to a gateway apparatus for configuring a communication network of a substation automation system.

2. Background of the Invention

A substation automation system has been researched and applied for minimizing maintenance and repair costs for a substation by minimizing roles of persons for manipulation and monitoring within the substation. In such substation automation system, a real-time based industrial embedded system has been used in the related art as a communication network. In other words, the communication network has been configured and operated by a structure of a system, which includes a multi-layered supporting rack (simply referred to as a rack) having a standardized size and connected with, namely, a connector and a data communication circuit board at a rear side thereof, and an electronic device connected to the corresponding rear connector for each layer by a plug-in method (i.e., a method of connecting a plurality of connection pins to a connector having a plurality of connection holes corresponding to the connection pins) and having an input/output module. Especially, for data communication between Intelligent Electronic Devices (IME), such as a digital protection relay, as the electronic device, a VERSA Module Eurocard bus ((VME) bus), which is an industrial parallel data bus, has been widely used in the aspects of high-speed data communication with low costs, In recent time, the substation automation is required to connect every communication system and intelligent electronic device within the substation via an Ethernet as a serial communication network, and generate, store and manage in a file unit every engineering information (data) necessary for management of the substation. Those engineering files employ a file format commonly useable by all of the communication systems and intelligent electronic devices within the substation. Accordingly, the corresponding communication systems and intelligent electronic devices receive and process the engineering files and report the result, thereby automatically managing the substation.

The change in the substation technology requires the change in software configuration of physical components and operating system programs of the communication systems and the intelligent electronic devices installed in the substation. Hence, a file system and a system having a computer architecture capable of performing a multi-task processing function are needed.

In physical components in the computer architecture, a Peripheral Component Interconnect (PCI) bus as a serial data bus may be used as a data bus. Also, in every communication device and intelligent electronic device within the substation, the VME bus as the industrial parallel data bus, as aforementioned, is usually used as the data bus. That is, the different data buses are used so as to be incompatible. Consequently, the architecture of the existing system should be drastically modified or a product should be replaced, which may cause an increase in costs.

SUMMARY OF THE INVENTION

Therefore, an aspect of the present disclosure is to provide a communication gateway apparatus for a substation automation system, which can allow for compatibility of data bus between a system in a computer architecture using a Peripheral Component Interconnect (PCI) bus and an industrial embedded system, which includes existing Intelligent Electronic Devices (IEDs) installed within the substation each using a VERSA Module Eurocard (VME) bus, and minimize installation costs by virtue of non-need of replacement or drastic structure modification of a previously constructed industrial network system.

To achieve these and other advantages and in accordance with the purpose of this disclosure, as embodied and broadly described herein, there is provided a communication gateway apparatus for a substation automation system, the gateway apparatus including a VERSA Module Eurocard (VME) bus to provide a data communication path;

a Peripheral Component Interconnect (PCI)-VME module connected to the VME bus for communication and having a PCI-VME bus bridge circuit to transfer data of the VME bus to a PCI bus or data of the PCI bus to the VME bus;

and a plurality of input/output modules connected to the VME bus for communication.

According to one aspect of the present disclosure, the PCI-VME module may have an operating system program installed therein to convert the data into a file.

In accordance with another aspect of the present disclosure, there is provided a communication gateway apparatus for a substation automation system for collecting data from a plurality of intelligent electronic devices disposed within the substation to transmit to a management device or transmitting a command from the management device to the plurality of intelligent electronic devices, the gateway apparatus including: a VERSA Module Eurocard (VME) bus to provide a data communication path;

a main module connected to the VME bus for communication and having a VME bus controller so as to serve as a first master for the VME bus, the main module collecting data from the plurality of intelligent electronic devices to transmit to the management device or transmit the command of the management device to the plurality of intelligent electronic devices;

a PCI-VME module connected to the VME bus, and having a PCI-VME bus bridge circuit to transfer data of the VME bus to a PCI bus or data of the PCI bus to the VME bus, the PCI-VME module having an operating system program to convert the data into a file; and a plurality of input/output modules connected to the VME bus for communication and each of the input/output modules disposed in a corresponding device of the intelligent electronic devices.

According to one aspect of the present disclosure, the PCI-VME module may include a readable and writable Dual Port RAM (DPRAM) connected to the PCI-VME bus bridge circuit, for data communication with the main module and the plurality of input/output modules connected to the VME bus for communication.

According to another aspect of the present disclosure, the PCI-VME module may further include a PCI bus controller connected to the PCI-VME bus bridge circuit so as to serve as a second master for the VME bus.

According to another aspect of the present disclosure, the PCI-VME module and the main module may be configured as a single module, to collect data from the plurality of intelligent electronic devices to transmit to the management device or transmit the command from the management device to the plurality of intelligent electronic devices, transfer data of the VME bus to the PCI bus or data of the PCI bus to the VME bus, and convert the data into a file.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this disclosure, illustrate exemplary embodiments and together with the description serve to explain the principles of the invention.

In the drawings:

FIG. 1 is a block diagram showing a configuration of a communication gateway apparatus for a substation automation system in accordance with one exemplary embodiment of this disclosure.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

FIG. 1 is a block diagram showing a configuration of a communication gateway apparatus for a substation automation system in accordance with one exemplary embodiment of this disclosure. Hereinafter, description will be given of configuration and operation of the present disclosure with reference to FIG. 1.

As shown in FIG. 1, a communication gateway apparatus for a substation automation system in accordance with one exemplary embodiment is an apparatus for receiving data (engineering data) from a plurality of intelligent electronic devices, for example, a plurality of digital protection relays installed within a substation and transmitting the received data to a management device (can be configured by a personal computer or server as hardware or a computer having a substation automation program and a database program as software installed therein), or transmitting a command from the management device to the plurality of intelligent electronic devices.

The communication gateway apparatus for the substation automation system includes a VERSA Module Eurocard (VME) bus 1 configured in physical form of a backplane printed circuit board, a plurality of input/output modules 3-1, 3-2, . . . , 3-n , and a Peripheral Component Interconnect (PCI)-VME module 4.

The VME bus 1, which is a parallel data communication bus for providing a data communication path, may be implemented as a printed circuit board, namely, a backplane printed circuit board 1a, which is disposed at the rear of a multi-layered rack.

The plurality of input/output modules 3-1, 3-2, . . . , 3-n may be connected to the VME bus 1 for communication, and be included in a plurality of intelligent electronic devices, respectively, such as digital protection relays installed in the substation, for data transmission and reception.

The plurality of input/output modules 3-1, 3-2, . . . , 3-n , as shown in FIG. 1, respectively include VME bus decoders $3a1$, $3a2$, . . . , $3an$ , Dual Port RAMs (DPRAMs) $3b1$, $3b2$, . . . , $3bn$ , and slave communication units $3c1$, $3c2$, . . . , $3cn$.

Each of the slave communication units $3c1$, $3c2$, . . . , $3c$ n may output engineering data (hereinafter, referred to as data) changed (or newly generated) in the corresponding input/output module 3-1, 3-2, . . . , 3-n , thus to transmit to a main module 2 to be explained later or the PCI-VME module 4. Here, the changed data denotes engineering data including state information received from a transformer, an insulating switchgear, a relay and the like, which are controlled by the corresponding intelligent electronic device.

The VME bus decoder $3a1$, $3a2$, . . . , $3a$ n is a circuit for forwarding a data transmission request command transmitted from the main module 2 or PCI-VME module 4 via the VME bus 1, or data output from the corresponding slave communication unit $3c1$, $3c2$, . . . , $3c$ n to the main module 2 or PCI-VME module 4 via the VME bus 1.

Each of the DPRAMs $3b1$, $3b2$, . . . , $3b$ n is connected between the corresponding bus decoder $3a1$, $3a2$, . . . , $3a$ n and the corresponding slave communication unit $3c1$, $3c2$, . . . , $3c$ n within the corresponding input/output module 3-1, 3-2, . . . , 3-n , to receive a data transmission command transmitted from the main module 2 or the PCI-VME module 4 via the VME bus 1, and transfer data from the slave communication unit $3c1$, $3c2$, . . . , $3c$ n to the VME bus decoder $3a1$, $3a2$, . . . , $3an$ , such that the data can be transmitted via the VME bus 1.

The PCI-VME module 4, as shown in FIG. 1, includes a VME master/slave communication unit $4a$, a PCI bus controller $4b$, a PCI-VME bus bridge circuit $4c$, a DPRAM $4d$ and a PCI bus $4e$.

The PCI-VME module 4 is connected to the VME bus 1 for communication.

The PCI-VME bus bridge circuit $4c$ can transfer data of the VME bus 1 to the PCI bus $4e$, or data of the PCI bus $4e$ to the VME bus 1.

For data communication with the main module 2 and/or the plurality of input/output modules 3-1, 3-2, . . . , 3-n via the VME bus 1, the PCI-VME module 4 may include the DPRAM $4d$, which is readable and writable and connected to the PCI-VME bus bridge circuit $4c$.

Here, the PCI-VME bus bridge circuit $4c$ may be configured by a logic circuit of a Programmable Logic Device (PLD), and mounted, in form of a semiconductor integrated circuit, to the PCI-VME module 4.

In order for the PCI-VME module 4 to play a role of a second master for the VME bus 1, the PCI-VME module 4 may further include the PCI bus controller $4b$ connected to the PCI-VME bus bridge circuit $4c$. Hence, when the PCI-VME module 4 serves as the second master for the VME bus 1 (in case where the main module 2 to be explained later is set to a first master), the PCI bus controller $4b$ may directly transmit data for instructing data transmission to the entire input/output modules 3-1, 3-2, . . . , 3-n or a specific one of them via the PCI-VME bus bridge circuit $4c$ and the VME bus 1 or receive and collect data from the entire input/output modules 3-1, 3-2, . . . , 3-n or a specific one of them via the PCI-VME bus bridge circuit 4c, without passing through the DPRAM 4d.

The PCI-VME module 4 may be provided with an operating system program for converting data into a file. So-called WINDOW or LINUX, widely well known, may be installed as the operating system program.

When the corresponding PCI-VME module 4 is set to a slave, the VME master/slave communication unit 4a may read out the received new (changed)_data from the DPRAM 4d, convert the data into a file using the operating system program installed in the PCI-VME module 4, and write the converted data file in the DPRAM 4d for transmission to the main module 2. The data file written in the DPRAM 4d may be then transmitted to the main module 2 via the PCI-VME bus bridge circuit 4c and VME bus 1.

When the corresponding PCI-VME module 4 is set to a master, the VME master/slave communication unit 4a may transmit, as a master for the VME bus 1, command data for requesting for transmission of new (changed) data to the entire input/output modules 3-1, 3-2, . . . , 3-n of the intelligent electronic devices, such as the digital protection relays located within the substation or a specific one of input/output modules 3-1, 3-2, . . . , 3-n , using the PCI bus controller 4b. Also, the VME master/slave communication unit 4a may read the received changed data out of the DPRAM 4d, convert the data into a file using the operating system program installed in the PCI-VME module 4, and transmit the converted data file to a management device via a short-distance and/or global network, such as an Ethernet and/or an Internet, or a dedicated serial communication line.

The PCI-VME module 4 may use the PCI bus 4e as a path for data communication between circuits including the PCI-VME bus bridge circuit 4c. The PCI-VME module 4 may be implemented as a circuit board having a personal computer architecture, which uses a hard disk or a flash memory, a central processing unit (CPU), a RAM (Random Access Memory) and the like in order to install and run the operating system program.

The PCI-VME module 4 may be connected for communication to the management device in a long distance remote position via the well-known Ethernet and/or Internet, or a management device within a short distance via a dedicated serial communication line (for example, RS232C or RS485 type serial communication line).

The communication gateway apparatus for the substation automation system may further include the main module 2.

The main module 2 is connected to the VME bus 1 for communication. The main module 2 may include a VME bus controller 2b to serve as a first master for the VME bus 1, thus to collect data from the input/output modules 3-1, 3-2, . . . , 3-n of the plurality of intelligent electronic devices disposed within the substation to transmit to the management device or transmit a command from the management device to the input/output modules 3-1, 3-2, . . . , 3-n of the plurality of intelligent electronic devices.

Here, as the main module 2 is further installed in the substation in addition to the PCI-VME module 4, the previously installed main module 2 can be utilized as a backup device for a communication master device, in the configuration that the PCI-VME module 4 is further provided in the network system for the substation automation, which includes the main module 2, the plurality of input/output modules 3-1, 3-2, . . . , 3-n , and the VME bus 1.

Hereinafter, description will be given of an operation of the communication gateway apparatus for the substation automation system.

First, an operation when the main module 2 is set to a communication master will be described.

Upon receiving a transmission request for new (changed) data, responsive to a periodical manipulation or a manager's non-periodical manipulation, from the close or long distance positioned management device, as aforementioned, via a wired or wireless communication, the main module 2, which is set to the master, transmits command data for requesting for transmission of the new (changed) data to the entire input/output modules 3-1, 3-2, . . . , 3-n of intelligent electronic devices, such as a plurality of digital protection relays disposed within the substation or a specific one of the input/output modules 3-1, 3-2, . . . , 3-n , via the VME bus 1 using the VME bus controller 2b.

The VME bus decoder(s) 3a1, 3a2, . . . , 3a n of the entire input/output modules 3a1, 3a2, . . . , 3a n of intelligent electronic devices or the specific one of the entire input/output modules 3a1, 3a2, . . . , 3a n then writes the corresponding command data into the entire DPRAMs 3b1, 3b2, . . . , 3b n or the specific one of DPRAMs 3b1, 3b2, . . . 3bn.

The slave communication unit 3c1, 3c2, . . . , 3c n writes the data changed (i.e., data indicating state information received from a transformer, an insulating switchgear, a relay and the like controlled by the corresponding intelligent electronic device) in the corresponding input/output module(s) 3-1, 3-2, . . . , 3-n into the corresponding DPRAM 3b1, 3b2, . . . , 3bn.

Accordingly, the corresponding VME bus decoder 3a1, 3a2, . . . , 3a n reads the changed data out of the corresponding DPRAM 3b1, 3b2, . . . , 3b n to forward to the main module 2 and the PCI-VME module 4.

The PCI-VME module 4 transfers the data received via the external VME bus 1 to the internal PCI bus 4e by the PCI-VME bus bridge circuit 4c mounted therein, thereby writing the changed data into the DPRAM 4d.

The VME master/slave communication unit 4a reads the changed data out of the DPRAM 4d, converts the data into a file using an operating system program installed in the PCI-VME module 4, and writes the converted data file in the DPRAM 4d to be transferred to the main module 2 again. The data file written in the DPRAM 4d is forwarded to the main module 2 via the PCI-VME bus bridge circuit 4c and the VME bus 1.

The main module 2 transmits the received data file to the management device using a short-distance network and/or global network, such as Ethernet and/or Internet via a wired or wireless communication, or using a dedicated serial communication network.

Hereinafter, an operation when the PCI-VME module 4 is set to a communication master will be described.

Upon receiving a transmission request for new (changed) data, responsive to a periodical manipulation or a manager's non-periodical manipulation, from a close or long distance positioned management device, as aforementioned, via a wired or wireless communication, the VME master/slave communication unit 4a of the PCI-VME module 4, which is set to the master, transmits command data for requesting for transmission of the new (changed) data to the entire input/output modules 3-1, 3-2, . . . , 3-n of intelligent electronic devices such as a plurality of digital protection relays disposed within the substation or a specific one of the entire input/output modules 3-1, 3-2, . . . , 3-n , via the VME bus 1 using the PCI bus controller 4b.

The VME bus decoders 3a1, 3a2, . . . , 3a n of the entire input/output modules 3a1, 3a2, . . . , 3a n of the intelligent electronic devices or the specific one of input/output modules 3a1, 3a2, ..., 3a n writes the corresponding command data into the entire DPRAMs 3b1, 3b2, ..., 3b n or one of DPRAMs 3b1, 3b2, ..., 3bn.

The corresponding slave communication unit 3c1, 3c2, ..., 3c n writes the changed data (i.e., data indicating state information received from a transformer, an insulating switchgear, a relay and the like controlled by the corresponding intelligent electronic device) for the corresponding input/output module 3-1, 3-2, ..., 3-n into the corresponding DPRAM 3b1, 3b2, ..., 3bn.

The VME bus decoder 3a1, 3a2, ..., 3a n then reads the changed data out of the corresponding DPRAM 3b1, 3b2, ..., 3b n so as to forward to the PCI-VME module 4 via the VME bus 1.

The VME master/slave communication unit 4a reads received changed data from the DPRAM 4d, converts the data into a file using the operating system program installed in the PCI-VME module 4, and transmits the converted data file to the management device via the short-distance network and/or global network, such as Ethernet and/or Internet, or the dedicated serial communication network.

The data file transmitted to the management device may be displayed and printed out by a computer having the substation automation program and a database program of the management device installed therein. Also, operating states of devices, such as a switchgear, a transformer, a circuit breaker and the like currently disposed within the substation, may be monitored and analyzed by the substation automation program.

Since the communication gateway apparatus for the substation automation system includes the PCI-VME module having the PCI-VME bus bridge circuit, it may be possible to forward data received from the plurality of input/output modules via the VME bus, which provides the data communication path, to the PCI bus or data of the PCI bus to the VME bus. Hence, it may be possible for the gateway apparatus to be compatible with a device having a computer architecture using the PCI bus, such that the device having the computer architecture can receive the data from the already installed plurality of input/output modules connected via the VME bus and convert the data into a file. Consequently, the substation automation system can obtain several effects, such as converting every transmit/receive data into a computer file, and reducing costs due to utilizing of a communication network, which uses the existing industrial VME bus.

In the communication gateway apparatus for the substation automation system, the PCI-VME module has the operating system program (typically, called 'OS'), such as WINDOW and LINUX installed therein, to convert data into a file format, accordingly, it may be possible to generate, store and manage, in a file unit, every engineering information (data) transmitted from input/output modules of a plurality of intelligent electronic devices within the substation and required for the management of the substation.

The communication gateway apparatus for the substation automation system is to collect data from a plurality of intelligent electronic devices disposed in the substation to forward to a management device or transmit a command from the management device to the plurality of intelligent electronic devices. The communication gateway apparatus for the substation automation system may include a main module connected to a VME bus for communication and having a VME bus controller to collect data from the intelligent electronic devices to forward to the management device or transmit a command from the management device to the plurality of intelligent electronic devices, and a PCI-VME module having a PCI-VME bus bridge circuit to transfer the data of the VME bus to a PCI bus or data of the PCI bus to the VME bus, and having an operating system program installed for converting data into a file. Hence, engineering data, which is collected from the plurality of intelligent electronic devices via the VME bus as an industrial serial data bus, can be converted into a computer file by the PCI-VME module to be forwarded to the management device by the main module. Also, the parallel data communication network in the structure of the existing VME bus can be used as it is, which can minimize an increase in costs for network construction, maintain communication efficiency, and generate, store and manage the engineering data of every facility within the substation in a unit of computer file.

In the communication gateway apparatus for the substation automation system, the PCI-VME module is provided with a readable and writable DPRAM connected to the PCI-VME bus bridge circuit, which allows for data transmission and reception with the main module and the plurality of input/output modules, which are connected to the VME bus via the DPRAMs for communication.

In the communication gateway apparatus for the substation automation system, the PCI-VME module further includes the PCI bus controller. Accordingly, the PCI-VME module can serve as a second master for the VME bus to instruct data transmission, thereby collecting engineering data from the plurality of input/output modules by itself.

In the communication gateway apparatus for the substation automation system, the PCI-VME module and the main module can be configured as a single module, for example, the PCI-VME module may be configured to function both the PCI-VME module and the main module. Hence, the existing main module can be simply replaced with the PCI-VME module. Also, the industrial VME bus, which is implemented in a physical form of the existing backplane printed circuit board, can be utilized as it is, whereby engineering data from the plurality of input/output modules can be generated, stored and managed in unit of a computer file with minimum costs.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A communication gateway apparatus for a substation automation system, the gateway apparatus comprising:
   a VERSA Module Eurocard (VME) bus to provide a data communication path;
   a Peripheral Component Interconnect (PCI)-VME module connected to the VME bus for communication, and having a PCI-VME bus bridge circuit to transfer data of the VME bus to a PCI bus or data of the PCI bus to the VME bus, and configured to serve as a second master for the VME bus with a PCI bus controller connected to the PIC-VME bus bridge circuit;
a main module coupled to the PCI-VME module through the VME bus for communication and the main module comprising a VME bus controller configured to serve as a first master for the VME bus,
wherein the main module is not a part of the PCI-VME module; and
a plurality of input/output modules connected to the VME bus for communication.

2. The gateway apparatus according to claim 1, wherein the PCI-VME module has an operating system program installed therein to convert the data into a file.

3. A communication gateway apparatus for a substation automation system for collecting data from a plurality of intelligent electronic devices disposed within the substation to transmit to a management device or transmitting a command from the management device to the plurality of intelligent electronic devices, the gateway apparatus comprising:
a VERSA Module Eurocard (VME) bus that provides a data communication path;
a main module connected to the VME bus for communication, and having a VME bus controller to serve as a first master for the VME bus, the main module collecting data from the plurality of intelligent electronic devices to transmit to the management device or transmit the command of the management device to the plurality of intelligent electronic devices,
wherein the main module is not a part of the PCI-VME module;
a PCI-VME module connected to the VME bus, and having a PCI-VME bus bridge circuit to transfer data of the VME bus to a PCI bus or data of the PCI bus to the VME bus, the PCI-VME module having an operating system program to convert the data into a file, and configured to serve as a second master for the VME bus with a PCI bus controller connected to the PCI-VME bus bridge circuit; and
a plurality of input/output modules connected to the VME bus for communication and each of the input/output modules disposed in a corresponding device of the intelligent electronic devices.

4. The gateway apparatus according to claim 3, wherein the PCI-VME module comprises a readable and writable Dual Port RAM (DPRAM) connected to the PCI-VME bus bridge circuit, for data communication with the main module and the plurality of input/output modules connected to the VME bus for communication.

5. The gateway apparatus according to claim 3, wherein the PCI-VME module and the main module are configured as a single module, to collect data from the plurality of intelligent electronic devices to transmit to the management device or transmit the command from the management device to the plurality of intelligent electronic devices, transfer data of the VME bus to the PCI bus or data of the PCI bus to the VME bus, and convert the data into a file.

\* \* \* \* \*